United States Patent
Krajnc et al.

(10) Patent No.: US 12,413,320 B2
(45) Date of Patent: Sep. 9, 2025

(54) COMMUNICATION TECHNOLOGY SELECTION FOR RADIO FREQUENCY BASED SENSING

(71) Applicant: SIGNIFY HOLDING B.V., Eindhoven (NL)

(72) Inventors: Hugo Jose Krajnc, Eindhoven (NL); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 498 days.

(21) Appl. No.: 17/632,511

(22) PCT Filed: Aug. 4, 2020

(86) PCT No.: PCT/EP2020/071840
§ 371 (c)(1),
(2) Date: Feb. 3, 2022

(87) PCT Pub. No.: WO2021/023725
PCT Pub. Date: Feb. 11, 2021

(65) Prior Publication Data
US 2022/0286213 A1    Sep. 8, 2022

Related U.S. Application Data

(60) Provisional application No. 62/883,204, filed on Aug. 6, 2019.

(30) Foreign Application Priority Data

Aug. 20, 2019 (EP) .................................. 19192522

(51) Int. Cl.
*H04B 17/318*    (2015.01)
(52) U.S. Cl.
CPC ................................ *H04B 17/318* (2015.01)

(58) Field of Classification Search
CPC ........ G01V 3/12; G08B 13/187; G08B 13/24; H04B 17/318
See application file for complete search history.

(56) References Cited

U.S. PATENT DOCUMENTS

| | | |
|---|---|---|
| 2007/0019672 A1 | 1/2007 | Guthrie |
| 2009/0016245 A1 | 1/2009 | Karls |
| | (Continued) | |

FOREIGN PATENT DOCUMENTS

| | | |
|---|---|---|
| CN | 101471704 A | 7/2009 |
| CN | 106059865 A | 10/2016 |
| | (Continued) | |

OTHER PUBLICATIONS www.arrow.com, "Combining Zigbee, Bluetooth and Beacons", Jul. 18, 2018, pp. 1-2.

(Continued)

*Primary Examiner* — Nguyen T Vo

(57) ABSTRACT

The present invention relates to selecting a communication technology (34, 36) in a radio frequency (RF)-based sensing system (100) with one or more nodes (26, 28, 30). The RF-based sensing system (100) is configured for performing RF-based sensing using one or more of two or more different communication technologies (34, 36). A communication technology (34) for performing RF-based sensing in the RF-based sensing system (100) is selected for one or more of the nodes (26, 28, 30) based on one or more parameters related to RF-based sensing in the RF-based sensing system (100). A communication technology (36) optimal for a current sensing application with a current sensing quality requirement in a current context considering the available system resources can be selected. The communication technologies can be wideband (34) and narrowband (36) communication technologies. The parameters can include sens- (Continued)

ing application parameters, sensing quality parameters, system resource parameters, and contextual parameters.

19 Claims, 4 Drawing Sheets

(56) References Cited

U.S. PATENT DOCUMENTS

| | | | |
|---|---|---|---|
| 2015/0048954 A1* | 2/2015 | Caicedo Fernandez | G08B 5/36 340/815.45 |
| 2017/0188181 A1 | 6/2017 | Jin et al. | |
| 2017/0311126 A1* | 10/2017 | Lu | G01S 5/14 |
| 2017/0311193 A1* | 10/2017 | Jiang | H04W 24/10 |
| 2017/0359804 A1 | 12/2017 | Manku et al. | |
| 2018/0365975 A1 | 12/2018 | Xu et al. | |
| 2019/0097865 A1 | 3/2019 | Xu et al. | |
| 2019/0230769 A1* | 7/2019 | Magielse | H05B 47/115 |
| 2019/0304529 A1* | 10/2019 | Wootton | G11C 11/2259 |

FOREIGN PATENT DOCUMENTS

| | | |
|---|---|---|
| KR | 20130096553 A | 8/2013 |
| WO | 2018228883 A1 | 12/2018 |

OTHER PUBLICATIONS www.electronicspecifier.com, "IoT Software Enables Zigbee and Bluetooth to Work Together", Nov. 8, 2017, pp. 1-3.
Steve Bush, "Nordic Supports Concurrent Zigbee and Bluetooth for Smart Homes", ElectronicsWeekly.com, Apr. 19, 2018, pp. 1-3.
Silicon Labs, "Expand Device Capability with Multiprotocol Connectivity", Apr. 11, 2018, pp. 1-21.
Silicon Labs, "Expand Device Capability with Multiprotocol Bluetooth and Zigbee Connectivity", 2019, pp. 1-7.

* cited by examiner

COMMUNICATION TECHNOLOGY SELECTION FOR RADIO FREQUENCY BASED SENSING

CROSS-REFERENCE TO PRIOR APPLICATIONS

This application is the U.S. National Phase application under 35 U.S.C. § 371 of International Application No. PCT/EP2020/071840, filed on Aug. 4, 2020, which claims the benefits of European Patent Application No. 19192522.1, filed on Aug. 20, 2019, and U.S. Patent Application No. 62/883,204, filed on Aug. 6, 2019. These applications are hereby incorporated by reference herein.

FIELD OF THE INVENTION

The present invention relates to a communication technology selection device for selecting a communication technology for performing radio frequency (RF)-based sensing, a RF-based sensing system, a method for selecting a communication technology for performing RF-based sensing, and a computer program product for selecting a communication technology for performing RF-based sensing.

BACKGROUND OF THE INVENTION

RF-based sensing allows for motion detection, occupancy detection, people counting, and other sensing applications based on analyzing how human bodies, pets or movable objects affect wireless signals flowing in a network.

US 2017/0359804 A1 shows a wireless communication network including a motion detection channel. For example, the motion detection channel can be embedded in the wireless communication network to perform motion detection operations alongside other wireless communication network operations. In some implementations, a chipset in a wireless network device uses a motion detection channel to detect motion in a space, and the same chipset uses another wireless communication channel to communicate wireless network traffic, for example, with other wireless devices. A set of wireless communication channels can be defined according to a wireless communication standard, and one or more of the wireless communication channels can be allocated for motion detection. As an example, one or more motion standard wireless communication channels in one or more of the 802.11 family of standards developed by IEEE, a ZigBee standard or another wireless communication standard can be allocated as a motion detection channel for motion detection.

US 2019/097865 A1 discloses method for recognizing and classifying events in a venue based on a wireless signal. An event recognition engine trains a classifier based on the training channel information based on least one time series of training channel information of the wireless multipath channel between a first receiver and a first transmitter; and apples the classifier to: classify the current channel information based on at least one time series of current channel information of the wireless multipath channel between a second receiver and a second transmitter; and associate the current event with at least one of: a known event, an unknown event and another event.

SUMMARY OF THE INVENTION

It can be seen as an object of the present invention to provide a communication technology selection device, a RF-based sensing system, a method, a computer program product, and a computer readable medium which allow an improved performance of RF-based sensing.

In a first aspect of the present invention a communication technology selection device for a RF-based sensing system with one or more nodes is presented. The RF-based sensing system is configured for performing RF-based sensing using one or more of two or more different communication technologies. The communication technology selection device is configured for selecting a communication technology for performing RF-based sensing in the RF-based sensing system for one or more of the nodes based on one or more parameters related to RF-based sensing in the RF-based sensing system.

Since the communication technology selection device is configured for selecting a communication technology for performing RF-based sensing in the RF-based sensing system for one or more of the nodes based on one or more parameters related to RF-based sensing in the RF-based sensing system, performance of the RF-based sensing can be improved. Furthermore, a communication technology can be selected for each individual node, such that different nodes in the RF-based sensing system can use different communication technologies. The communication technology used by a respective node or nodes can be optimized to the specific requirements of the node or nodes, e.g., if the node or nodes have low battery life, a low energy consumption communication technology can be used and if the node or nodes cannot sustain RF-based sensing traffic using a narrowband communication technology due to low amount of currently available bandwidth, instead a wideband communication technology or another communication technology with more currently available bandwidth can be used by the node or nodes.

Changing a frequency of the communication technology to a frequency of a set of frequencies if the communication technology is defined by the set of frequencies, does not change the communication technology, while changing a frequency of the communication technology if the communication technology is defined by only one frequency, changes the communication technology. The frequencies can also for example include a set or range of frequencies. For example, in case of Bluetooth communication protocol, hopping through different frequencies of a set of frequencies can be performed for avoiding interference of RF signals. A communication technology is defined by communication technology parameters including one or more of a communication protocol, one or more frequencies, a channel bandwidth, a number of streams, a stream data rate, and a modulation. Changing one of the communication technology parameters changes the communication technology.

The communication technology parameters can additionally include one or more of a demodulation and a directionality. For example, a certain modulation can be demodulated in different ways by two or more different demodulations, such as for example to balance a demodulation speed and a demodulation error rate. Directionality can for example include omnidirectional and directional transmission. Omnidirectional transmissions can for example allow a volumetric view of the sensing volume, while directional transmissions can for example allow a narrow beam, e.g. for scanning like a laser scanner or for having a fixed directionality.

RF-based sensing can be performed by transmitting RF signals from one node to another node and analyzing the received RF signals. If the RF signals hit one or more objects on their way between the nodes, the RF signals are disturbed, such as scattered, absorbed, reflected, or any combination thereof. These disturbances can be analyzed and used for performing RF-based sensing. The node or nodes can also perform RF-based sensing by transmitting RF signals into a specific volume, receiving reflected RF signals from the specific volume, and analyzing the reflected RF signals. For example, one antenna of an antenna array of a node can transmit the RF signals and another antenna of the antenna array of the same node can receive the reflected RF signals, which allows analyzing the reflected RF signals in the same node that transmitted the RF signals. Alternatively or additionally, one node can transmit RF signals into a specific volume and the reflected RF signals can be received and analyzed by another node for performing RF-based sensing. The disturbed and/or reflected RF signals can include an RF-based sensing fingerprint based on signal parameters, such as real and imaginary part of electrical permittivity and magnetic susceptibility. Different communication technologies have different absorption and reflection characteristics resulting in different RF-based sensing fingerprints. Using different communication technologies can allow to optimize the performance of the RF-based sensing, as the communication technology optimal for a current sensing application with a current sensing quality requirement in a current context, e.g., environment, and considering the available system resources can be selected.

In case that RF signals are transmitted by one node and disturbed and/or reflected RF signals are received by another node, the RF-based sensing system includes two or more nodes and the communication technology selection device is configured for selecting a communication technology for performing RF-based sensing in the RF-based sensing system for two or more of the two or more nodes based on one or more parameters related to RF-based sensing in the RF-based sensing system.

RF-based sensing requires a certain network topology and amount and type of sensing traffic flowing between the one or more of the nodes covering the specific volume in order to acquire a sufficient number of usable samples. Selecting a communication technology for performing RF-based sensing in the RF-based sensing system for the one or more of the nodes based on the one or more parameters related to RF-based sensing in the RF-based sensing system can allow more samples to be obtained in the specific volume covered by the one or more nodes. This can allow a reduced latency of detection, a reduced amount of false positives, a reduced amount of false negatives, or a combination thereof. Furthermore, network traffic, in particular sensing traffic, can be optimized.

The communication protocols included in the communication technology parameter can include ZigBee, Bluetooth, Thread, one or more WiFi communication protocols, or any other wireless communication protocol. The WiFi communication protocols can include protocols of the IEEE 802.11 family, such as IEEE 802.11ax and IEEE 802.11ay.

The frequencies included in the communication technology parameter can for example include values in the GHz range, such as 2.4 GHz band, 5 GHz band, and 60 GHz band.

The number of streams included in the communication technology parameter can for example include one or more streams, such as 2, 3, or 4 streams. The maximal number of streams can for example depend on the number of multiple input multiple output channels.

The modulation included in the communication technology parameter can for example include orthogonal frequency-division multiplexing (OFDM), direct-sequence spread spectrum (DSSS), frequency-hopping spread spectrum (FHSS), on-off keying (OOK), binary phase shift keying (BPSK), quadrature phase shift keying (QPSK), quadrature amplitude modulation (QAM), or any other modulation.

Values of the communication technology parameters can also be included and selected from standards, such as standards for communication protocols published by the IEEE, such as IEEE 802.15.4, IEEE 802.1 lax, IEEE 802.11ay, or any other communication protocol.

The communication technology selection device can be configured for selecting the communication technology for one node, a set of nodes, or all nodes of the RF-based sensing system. Selecting the communication technology for all nodes of the RF-based sensing system can correspond to selecting the communication technology for the RF-based sensing system.

RF-based sensing can be performed in the RF-based sensing system using one or more communication technologies. One or more communication technologies can be available at each of the one or more nodes. For example, one or more nodes can perform RF-based sensing using one communication technology and one or more nodes can perform RF-based sensing using another communication technology. Alternatively, for example, all nodes of the RF-based sensing system can perform RF-based sensing using the same communication technology. Alternatively, one of the nodes can also perform RF-based sensing using two or more different communication technologies. The nodes do not need to use two different communication technologies for performing RF-based sensing, but the nodes can use two different communication technologies for performing RF-based sensing. The communication technology selection device allows selecting the communication technology or communication technologies for the nodes in order to optimize the RF-based sensing performance.

The RF-based sensing system can also comprise one or more first nodes configured for performing RF-based sensing using a first communication technology and one or more second nodes configured for performing RF-based sensing using a second communication technology, and the communication technology selection device can be configured for selecting the first nodes or the second nodes to perform the RF-based sensing by selecting a communication technology for performing RF-based sensing in the RF-based sensing system based on the one or more parameters related to RF-based sensing in the RF-based sensing system. The first nodes and the second nodes can be arranged and configured for covering the same specific volume, overlapping volumes, or different volumes for performing RF-based sensing in the volume. The communication technology selection device can allow to select the nodes using the respective optimal communication technology for performing RF-based sensing in this case.

The communication technology selection device can cause the one or more of the nodes to use the selected communication technology for performing RF-based sensing. The communication technology selection device can for example transmit a control signal for controlling the one or more of the nodes such that the one or more of the nodes use the selected communication technology for performing RF-based sensing.

The communication technology selection device can be configured for selecting the communication technology for performing RF-based sensing in the RF-based sensing system for the one or more of the nodes in order to optimize a performance of the RF-based sensing system.

The RF-based sensing can for example be passive RF sensing.

The two or more communication technologies can include one or more narrowband communication technologies and one or more wideband communication technologies. For narrowband communication technologies, the bandwidth of a signal does not significantly exceed a channel's coherence bandwidth. For wideband communication technologies, the signal significantly exceeds a channel's coherence bandwidth. The narrowband communication technologies can for example include communication protocols such as ZigBee, Bluetooth, Thread, or other narrowband communication protocols. The wideband communication technologies can for example include wideband communication protocols, such as one or more of the IEEE 802.11 wideband protocols, including WiFi in 2.4 GHz band, WiFi in 5 GHz band, or WiFi in 60 GHz band, Ultra-wideband (UWB) or any other wideband communication protocols. Using a narrowband communication technology for RF-based sensing can allow to reduce energy consumption. Using a wideband communication technology for RF-based sensing can allow to include more nodes in the RF-based sensing system performing the RF-based sensing.

The communication technology selection device can be configured for selecting between a narrowband communication technology and a wideband communication technology for performing RF-based sensing. This can allow an optimized performance of a respective node and the RF-based sensing system for performing RF-based sensing.

The communication technology selection device can be configured for selecting one of the wideband communication technologies based on a parameter which includes an information on whether the one or more nodes are configured for performing RF-based sensing using received signal strength indication (RSSI) or channel state information (CSI). RSSI is a measurement of power present in a received RF signal. CSI describes how a RF signal propagates from a node to an object and from the object to another node after reflecting at the object and includes the combined effects of scattering, fading, and power decay with distance. CSI can provide richer information about signal absorption, reflections, delays, multipath, and other properties of the RF signal propagation. This allows to select wideband communication technologies based on the capabilities of the nodes and can allow to optimize the performance of the nodes and the RF-based sensing system. RF-based sensing using CSI may have a better performance than RF-based sensing using RSSI, as RF-based sensing using CSI can be less noisy than RF-based sensing using RSSI.

The communication technology selection device can be configured for controlling the nodes based on the parameter which includes the information on whether the one or more nodes are configured for performing RF-based sensing using RSSI or CSI. For example, if the node is not configured for performing RF-based sensing using CSI, the communication technology selection device can be configured for causing the node to act only as transmitter node but not as receiver node. A transmitter node is a node which only transmits RF signals for performing RF-based sensing. Additionally or alternatively, if another node is configured for performing RF-based sensing using CSI, the communication technology selection device can be configured for causing the other node to act as receiver node. A receiver node is a node which only receives RF signals for performing RF-based sensing. This can allow for making best use of RSSI versus CSI depending on application needs and local availability of data, nodes, or both.

The communication technology selection device can be configured for switching the communication technology for performing RF-based sensing in the RF-based sensing system for one or more of the nodes between a communication technology with CSI and a communication technology with RSSI based on the one or more parameters related to RF-based sensing in the RF-based sensing system. This can allow optimizing the energy consumption of the nodes, as well as of the RF-based sensing system.

The one or more parameters related to RF-based sensing in the RF-based sensing system can include one or more of: a sensing application parameter, a sensing quality parameter, a system resource parameter, a contextual parameter. The one or more parameters related to RF-based sensing in the RF-based sensing system can for example include or be a currently available bandwidth for the two or more different communication technologies. The one or more parameters related to RF-based sensing in the RF-based sensing system can also for example include or be a currently available bandwidth for one or more of the two or more communication technologies.

The sensing application parameter can include one or more of: presence detection, motion detection, moveable object counting, breathing rate measurement, heart rate measurement, shape detection, gesture detection. The sensing application parameter can also include people counting, simple motion detection, fine-grained motion detection, breathing detection, fall detection, or any other sensing application parameter or combinations thereof. The sensing application parameters are related to what needs to be sensed and can for example describe a requirement of the sensing application for detecting fine-grained motion such as trembling of a hand of an elderly person.

The sensing quality parameter can include one or more of: sensing speed, sensing accuracy, reliability, latency, spatial resolution. The sensing quality parameter can also include detection speed, detection accuracy, quality of sensing, or any other sensing quality parameter or combinations thereof.

The system resource parameter can include one or more of: number of the one or more of the nodes, number of nodes in the RF-based sensing system, arrangement of the one or more of the nodes, arrangement of the nodes in the RF-based sensing system, network topology, such as a star topology, or network topologies, energy consumption, battery life, available bandwidth, required bandwidth, connectivity, availability of a communication technology at the one or more of the nodes, availability of CSI at the one or more of the nodes, availability of RSSI at the one or more of the nodes, an available processing power, an expected RF signal exposure to an object, such as a body. The system resource parameter can also include node resource parameters, system performance, node performance, network performance, range towards a gateway, meshing, network topology of the one or more of the nodes, network topology or network topologies of the nodes of the RF-based sensing system, energy consumption by the one or more of the nodes, energy consumption of the RF-based sensing system, battery life of the one or more nodes, battery life of the nodes of the RF-based sensing system, available bandwidth of the one or more of the nodes, available bandwidth of the RF-based sensing system, required bandwidth of the one or more of the nodes, required bandwidth of the RF-based sensing system, connectivity of the one or more of the nodes, connectivity of the nodes of the RF-based sensing system, an available processing power of the one or more of the nodes, an available processing power of the RF-based sensing system, or any other system resource parameter or combinations thereof.

The system resource parameters are related to the RF-based sensing system capabilities and can for example be used to determine whether the RF-based sensing is optimized by switching the communication technology for the one or more nodes, as sensing traffic cannot be sustained using the current communication technology. The system resource parameters can also be used to determine whether low energy consumption is desired, e.g., in case of low battery life of a node.

The contextual parameter can include one or more of: a currently available bandwidth for the two or more different communication technologies, a currently available bandwidth for one or more of the two or more communication technologies, a time of day, an expected activity, a personalized acceptable wireless exposure, a size of an object, a movement speed of an object, a likelihood for interference signals, a number of objects, a disturbing object, e.g., a chair, being present in a sensing volume. An expected activity can allow to efficiently select a sensing application which is most beneficial in the current context. For example, when a person is sleeping, breathing measurement using a WiFi communication technology may be beneficial, while when a person moves around, breathing measurement may not be possible and motion detection using a ZigBee communication technology may be beneficial. The personalized acceptable RF signal exposure corresponds to an RF signal exposure that a user is willing to accept and can depend on the energy of the RF signals of the respective communication technologies. The size of an object, for example a child, an adult, a pet, such as a cat or dog, can influence which communication technology allows to perform RF-based sensing efficiently. For example, using a WiFi communication technology may be beneficial over a ZigBee communication technology for performing RF-based sensing in case the object to be detected is a small pet, like a cat. The likelihood for interference signals can depend on other signal sources being present in the surroundings, e.g., wireless noise coming from a microwave in a kitchen, or wireless video streaming. A disturbing object can influence, such as alter or partially absorb the RF signals and in this manner compromise the RF-based sensing. The contextual parameter can also include one or more trigger events or any other additional contextual data. Trigger events can include detection of a motion or presence of an object.

Selecting the communication technology for performing RF-based sensing based on the one or more parameters which include sensing application parameters, sensing quality parameters, system resource parameters, and/or contextual parameters, allows to optimize the performance of the RF-based sensing. For example, a tradeoff between available system resources and application requirements can be used for determining which communication technology should be used by the one or more of the nodes.

The communication technology selection device can for example select a communication technology with low energy consumption, e.g. a ZigBee or Bluetooth low energy (BLE) communication technology, for the one or more of the nodes for performing RF-based sensing if a low energy consumption is desired, e.g., if battery life is low or if energy is costly.

The communication technology selection device can for example select a lower energy communication technology, such as WiFi in the 5 GHz band for performing RF-based sensing and select a higher energy communication technology, such as WiFi in the 60 GHz band for short periods in between for performing RF-based sensing for other applications in order to lower RF signal exposure to an object, such as a human or pet body.

The communication technology selection device can for example select a wideband communication technology, such as WiFi in the 60 GHz band, for all nodes if a large amount of nodes is present in the RF-based sensing system and RF-based sensing cannot be sustained using a narrowband communication technology due to the large RF-based sensing traffic.

The communication technology selection device can also for example select a narrowband communication technology for finer local area RF-based sensing and a wideband communication technology for a coarser larger area RF-based sensing in case that a large number of nodes are configured for using narrowband communication technologies for RF-based sensing and do not have a wideband communication technology available. For example, the nodes using coarser larger area RF-based sensing can use WiFi in the 60 GHz band. This can allow the nodes using WiFi in the 60 GHz band to detect subtler movements such as breathing, trembling and a person falling, albeit not being able to localize the respective event as well as the denser network of nodes using the narrowband communication technology, e.g., ZigBee communication technology. This can allow using the nodes that use ZigBee for determining an area where a respective event occurs while the nodes using WiFi in the 60 GHz band can be used for classifying the nature of the respective event.

The communication technology selection device can be configured for selecting the communication technology for performing RF-based sensing in the RF-based sensing system for the one or more of the nodes based on a combination of the parameters, such that the communication technology is changed when an impact of one of the parameters outweighs the impact of another parameter which used to have the highest impact before.

The communication technology selection device can be configured for determining a performance metric based on two or more of the parameters for the one or more of the nodes for which the communication technology is to be selected. Additionally, the communication technology selection device can be configured for selecting the communication technology in dependence of the performance metric. Since two or more parameters are considered for selecting the communication technology, performance of the RF-based sensing can be further increased. For example, specific sensing applications yield good results only when certain sensing quality is achieved. This can, for example, be considered in the performance metric. Furthermore, the available system resources and the context of the sensing application may be additionally or alternatively considered.

The communication technology selection device can be configured for determining the performance metric for one node, a set of nodes, or all nodes of the RF-based sensing system.

The one or more parameters related to RF-based sensing in the RF-based sensing system can include one or more monitored parameters related to RF-based sensing in the RF-based sensing system. This allows to consider up-to-date values of parameters when selecting the communication technology, such as a current battery life, current sensing traffic, currently available bandwidth for one or more of the two or more different communication technologies, currently available bandwidth for the two or more different communication technologies, or any other monitored parameter.

The nodes can be configured for using the communication technology for communicating with other nodes, the communication technology selection device, or both. The nodes can also be configured for using another communication technology for communicating with other nodes, the communication technology selection device, or both. The nodes can be configured for transmitting RF-based sensing values to the communication technology selection device, to other nodes, or both. The RF-based sensing values can be values of a monitored parameter. This allows the nodes and the communication technology selection device to transmit data and control signals between each other.

The communication technology selection device can comprise a monitoring unit configured for monitoring the one or more parameters related to RF-based sensing. The monitoring unit can include one or more sensors or the monitoring unit can be connected to one or more sensors. The sensors can for example include an RF sensor used for RF-based sensing. The monitoring unit can be configured for receiving RF-based sensing values of the one or more nodes as values of one monitored parameter. The monitoring unit can also include a clock for determining a current time as one monitored parameter or any other module for generating contextual data as monitored parameter. The contextual data can for example include a trigger event, such as detection of a presence or detection of a motion.

The communication technology selection device can comprise a control unit. The control unit can be configured for selecting the communication technology for performing RF-based sensing in the RF-based sensing system for the one or more of the nodes based on the one or more parameters related to RF-based sensing in the RF-based sensing system.

The communication technology selection device can be configured for selecting a second communication technology for the one or more of the nodes for performing RF-based sensing when a trigger event is detected during RF-based sensing using a first communication technology. The communication technology selection device can, for example, be configured for selecting the wideband communication technology for the one or more of the nodes for performing RF-based sensing when a trigger event is detected during RF-based sensing using the narrowband communication technology. The trigger event can for example be detection of a presence or motion of an object, such as a person. The RF-based sensing using the wideband communication technology can for example be used for determining a breathing rate or heart rate of the detected person. This allows using a communication technology with low energy consumption for detecting a person and switching to another communication technology when necessary for performing a respective sensing application with respect to the detected person.

The communication technology selection device can be configured for selecting one or more of the nodes for performing RF-based sensing based on the one or more parameters related to RF-based sensing in the RF-based sensing system. This can allow reducing energy consumption for RF-based sensing, as a subset of the nodes for performing RF-based sensing can be selected in case only a subset of nodes is required for the sensing application.

The communication technology selection device can be configured for selecting the one or more of the nodes for which the communication technology is to be selected by the communication technology selection device based on the one or more parameters related to RF-based sensing in the RF-based sensing system. This can allow an optimized performance of the RF-based sensing system, as subsets of the nodes can perform RF-based sensing using different communication technologies, e.g., if a subset of nodes has to switch to a wideband communication technology as the RF-based sensing traffic cannot be sustained locally, other nodes for which the RF-based sensing traffic can be sustained using a narrowband communication technology can use the narrowband communication technology with lower energy consumption.

In a further aspect of the present invention an RF-based sensing system for performing RF-based sensing using one or more of two or more different communication technologies is presented. The RF-based sensing system comprises one or more nodes and the communication technology selection device according to claim 1 or any embodiment of the communication technology selection device. Each of the nodes is configured for performing RF-based sensing using one or more of the two or more different communication technologies. The one or more nodes have one or more of the two or more different communication technologies available for using them in order to perform RF-based sensing. If the RF-based sensing system includes only one node, this node has the two or more different communication technologies available and one or more of the communication technologies can be selected for performing RF-based sensing. The RF-based sensing system allows selecting a communication technology for each of its nodes in order to optimize the performance of RF-based sensing.

The RF-based sensing system can be a connected system, such as a connected lighting (CL) system. Performing RF-based sensing in a connected system, such as a CL system allows for adding value, as the existing nodes and their wireless communication infrastructure can be used for performing RF-based sensing.

The two or more different communication technologies can be available in one or more of the one or more nodes. Having two or more different communication technologies available in one of the nodes can allow this node to perform the functions of a gateway, to select a communication technology in order to optimize the performance of this node for performing RF-based sensing, or both. The node having the two or more different communication technologies available can for example be a gateway or access point. The node can be configured for performing RF-based sensing using the two or more different communication technologies. Alternatively or additionally, if only a first communication technology is available at a first node and a second communication technology at a second node, the first node can be configured for performing RF-based sensing using the first communication technology and the second node can be configured for performing RF-based sensing using the second communication technology. Alternatively or additionally, two or more of the nodes can have two or more different communication technologies available and can be configured for using the two or more different communication technologies. The node or nodes can be configured for using the one or more of the two or more different communication technologies for performing RF-based sensing. The node or nodes can be configured for using the two or more different communication technologies, if they are available at the respective node or nodes.

The RF-based sensing system can also include two or more communication technology selection devices.

The one or more nodes can be configured for using the one or more communication technologies for communicating between each other.

The communication technology selection device can be included in one of the one or more nodes. Communication technology selection devices can also be included in two or more of the nodes, such as in each of the nodes of the RF-based sensing system. This allows locally selecting the communication technology for the nodes using the communication technology selection device included in the respective node. If only a subset of nodes includes a communication technology selection device, this can allow to locally select the communication technology for a subgroup of nodes associated with a respective one of the nodes that includes the communication technology selection device.

Two or more of the nodes can be configured for wirelessly communicating with each other using the one or more of the two or more different communication technologies. The nodes can also use another communication technology. For example, the nodes can use one communication technology for performing RF-based sensing and another communication technology for wirelessly communicating with each other.

One or more of the nodes can be configured for performing RF-based sensing using a first communication technology and one or more other of the nodes can be configured for performing RF-based sensing using a second communication technology. In case that RF-based sensing is performed by transmitting RF signals from one of the nodes and receiving and analyzing the disturbed and/or reflected RF signals in another node, two or more of the nodes can be configured for performing RF-based sensing using a first communication technology and two or more other of the nodes can be configured for performing RF-based sensing using a second communication technology. The first communication technology and the second communication technology are different communication technologies. In one embodiment, the first communication technology is a wideband communication technology and the second communication technology is a narrowband communication technology.

In a further aspect of the present invention a method for selecting a communication technology for performing RF-based sensing in a RF-based sensing system is presented. The RF-based sensing system includes one or more nodes and is configured for using one or more of two or more different communication technologies for performing RF-based sensing. The method comprises the step:

selecting a communication technology for performing RF-based sensing in the RF-based sensing system for one or more of the nodes based on one or more parameters related to RF-based sensing in the RF-based sensing system.

This method allows to improve the performance of RF-based sensing.

The method can comprise the step:
selecting the one or more of the nodes for which the communication technology is to be selected based on the one or more parameters related to RF-based sensing in the RF-based sensing system.

Additionally or alternatively, the method can comprise the step:
determining a performance metric based on two or more of the parameters related to RF-based sensing in the RF-based sensing system for the one or more of the nodes for which the communication technology is to be selected.

The step of selecting a communication technology for performing RF-based sensing in the RF-based sensing system for one or more of the nodes based on one or more parameters related to RF-based sensing in the RF-based sensing system can include selecting the communication technology in dependence of the performance metric.

The method can also comprise the step:
monitoring one or more parameters related to RF-based sensing in the RF-based sensing system.

The method can comprise the step:
selecting one or more of the nodes for performing RF-based sensing based on the one or more parameters related to RF-based sensing in the RF-based sensing system.

In a further aspect of the present invention a computer program product for selecting a communication technology for performing RF-based sensing in a RF-based sensing system with one or more nodes is presented. The RF-based sensing system can for example also include two or more nodes. The RF-based sensing system is configured for performing RF-based sensing using one or more of two or more different communication technologies. The computer program product comprises program code means for causing a processor to carry out the method as defined in claim 12 or any embodiment of the method, when the computer program product is run on the processor.

In a further aspect a computer readable medium having stored the computer program product of claim 14 is presented. Alternatively or additionally, the computer readable medium can have the computer program product according to any embodiment of the computer program product stored.

It shall be understood that the communication technology selection device of claim 1, the RF-based sensing system of claim 8, the method of claim 12, the computer program product of claim 14, and the computer readable medium of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
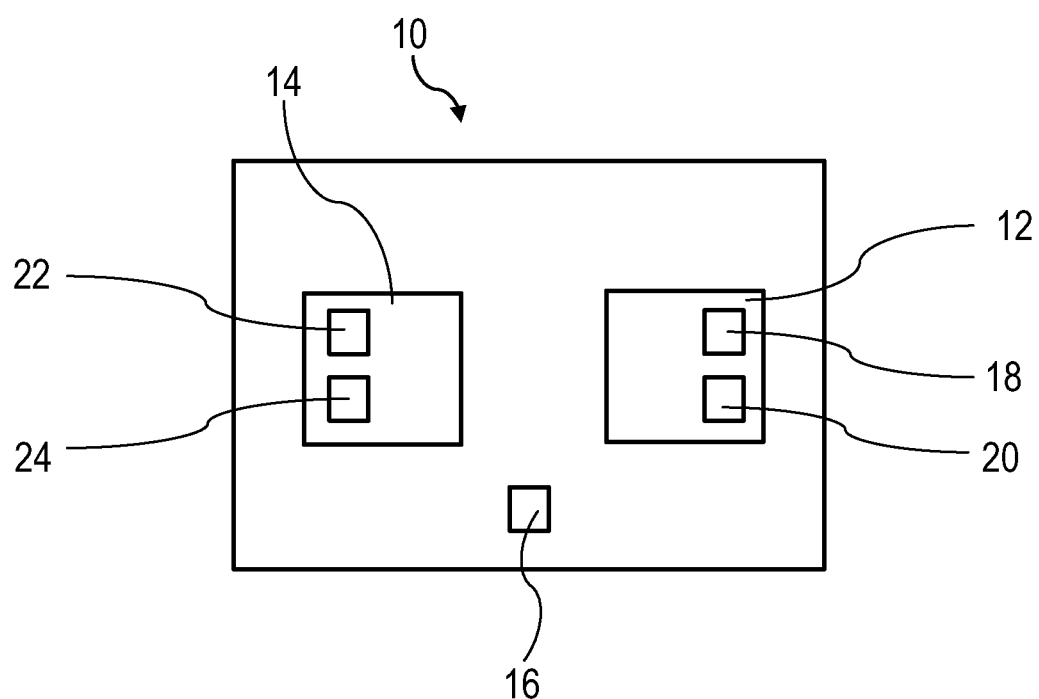
FIG. 1 shows schematically and exemplarily an embodiment of a communication technology selection device for a RF-based sensing system.
Figure 2:
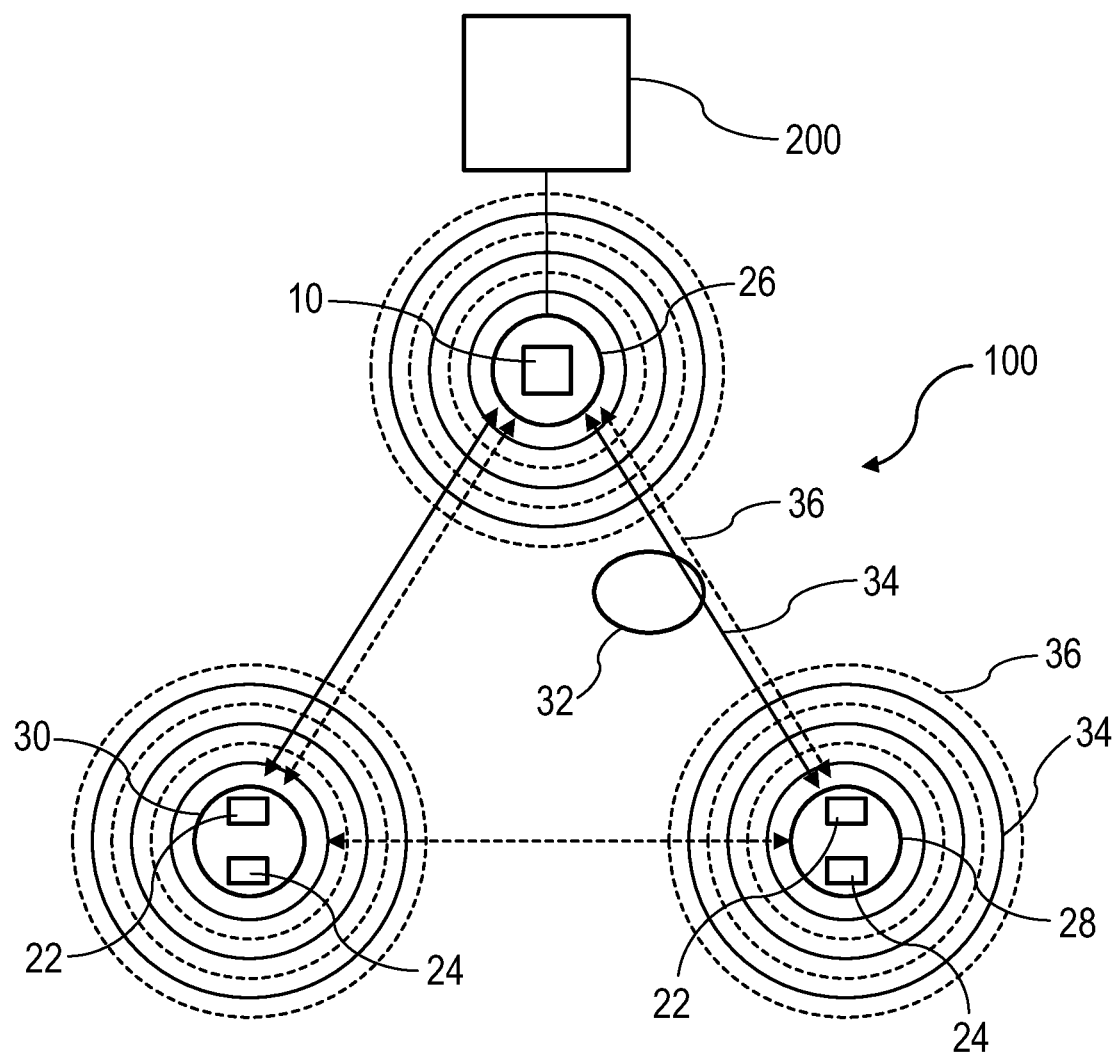
FIG. 2 shows schematically and exemplarily a first embodiment of the RF-based sensing system with the communication technology selection device included in a node of the RF-based sensing system.
Figure 3:
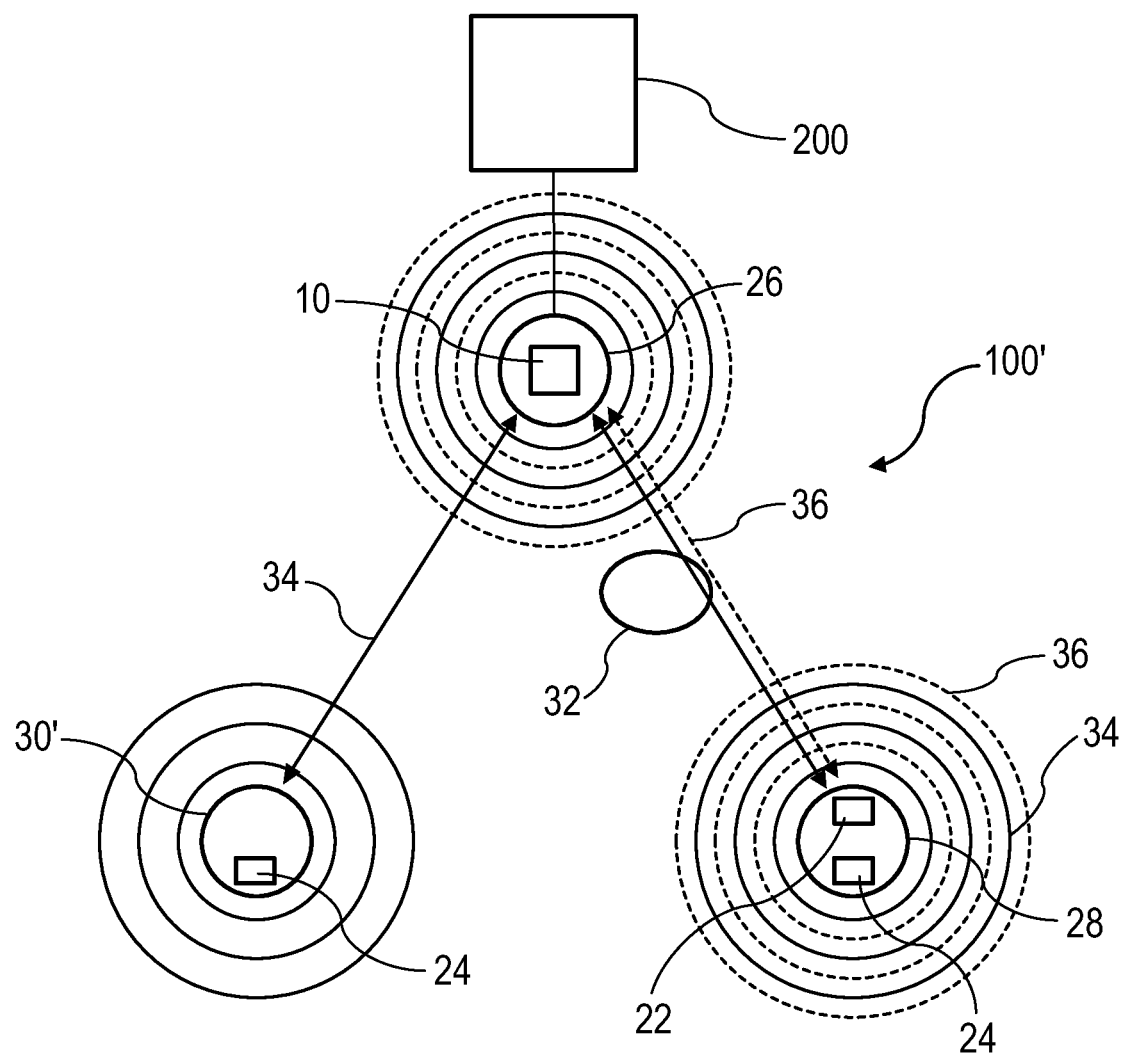
FIG. 3 shows schematically and exemplarily a second embodiment of the RF-based sensing system with the communication technology selection device included in a node of the RF-based sensing system.

FIG. 1 shows schematically and exemplarily a first embodiment of a communication technology selection device 10. The communication technology selection device 10 can be used for selecting a communication technology for performing RF-based sensing in a RF-based sensing system with one or more nodes, such as in a connected lighting (CL)

system, e.g. CL system 100 in FIG. 2 or CL system 100' in FIG. 3. The RF-based sensing system can also have two or more nodes, in case that RF-based sensing is performed by transmitting RF signals from one node and receiving and analyzing disturbed and/or reflected RF signals at another node. The CL system can perform RF-based sensing using one or more of two or more different communication technologies, e.g., a ZigBee communication technology and a WiFi communication technology. In the CL system, the nodes can for example be luminaires, switches, or sensors. This allows using the wireless infrastructure of the CL system to perform RF-based sensing, increasing the functionality of the CL system. RF-based sensing can for example be used for motion detection, presence detection, people counting, breathing rate measurements, heart rate measurements, shape detection, gesture detection, or for performing other sensing applications.

The communication technology selection device 10 comprises a control unit 12, a transceiver unit 14, and a monitoring unit 16. The transceiver unit 14 and the monitoring unit 16 are optional. The communication technology selection device 10 can be included in a node that includes a transceiver unit, such that the communication technology selection device can use the transceiver unit of the node. The node can also include a monitoring unit, e.g., an RF sensor, such that the communication technology selection device can use the monitoring unit of the node.

The control unit 12 includes a processor 18 and a computer readable medium in form of memory 20.

The transceiver unit 14 includes a narrowband transceiver in form of a ZigBee transceiver 22 and a wideband transceiver in form of WiFi transceiver 24. The ZigBee transceiver 22 uses a specific ZigBee communication technology in this embodiment. The ZigBee communication technology can for example use values of the communication technology parameters of one of the alternatives as defined by the IEEE 802.15.4 communication protocol and/or the ZigBee standard. The WiFi transceiver 24 uses WiFi communication technologies. In this embodiment, the WiFi transceiver 24 can be operated with different frequencies and different WiFi communication protocols. In this embodiment the WiFi transceiver 24 uses three different WiFi communication technologies, namely the IEEE 802.11ax communication protocol operated in the 2.4 GHz band and the 5 GHz band, and the IEEE 802.11ay communication protocol operated in the 60 GHz band. Further values of the communication technology parameters of the WiFi communication technologies are selected in dependence of the IEEE 802.11ax communication protocol and respectively the IEEE 802.11ay communication protocol. Antennas included as part of the transceiver unit 14 are not shown.

The transceiver unit 14 transmits RF signals to nodes and receives RF signals from nodes of the CL system for communicating wirelessly between the nodes and for performing RF-based sensing. RF signals transmitted from one node to another node are disturbed by objects within a specific volume between the nodes. The RF signals disturbed by an object in the specific volume can be analyzed in the control unit 12. The RF signals can use the ZigBee communication technology or one of the WiFi communication technologies. In other embodiments, the transceivers of the transceiver unit can be used for performing RF-based sensing by transmitting RF signals into a specific volume and by receiving and analyzing reflected RF signals from the specific volume by the same node. The RF signals can also be transmitted into the specific volume by one node and disturbed and/or reflected RF signals can be received and analyzed by another node.

In other embodiments a narrowband transceiver with one or more other narrowband communication technologies, such as communication technologies using narrowband communication protocols as thread or BLE, or other narrowband communication technologies can be provided and a wideband transceiver with one or more other wideband communication technologies can be provided. The RF signals, in the other embodiments, can use the respective communication technology for wirelessly communicating and for RF-based sensing.

In the following the functionality of the communication technology selection device 10 is explained, which selects a communication technology for performing RF-based sensing in the CL system for one or more of the nodes of the CL system based on one or more parameters related to RF-based sensing in the CL system. In this embodiment the communication technology selection device 10 selects the communication technology for performing RF-based sensing in the CL system for two or more nodes.

The memory 20 of the control unit 12 stores a computer program product for selecting a communication technology for performing RF-based sensing using one or more of two or more different communication technologies in a CL system with one or more nodes. The computer program product includes program code means for causing processor 18 to carry out a method for selecting a communication technology for performing RF-based sensing when the computer program product is run on the processor 18, e.g., the method as presented in FIG. 4. The memory 20 further includes a computer program product for operating the CL system, i.e., for controlling the luminaires of the CL system in order to provide lighting as well as for performing RF-based sensing.

Furthermore, the memory 20 stores the parameters related to RF-based sensing in the CL system. In this embodiment the parameters include: sensing application parameters, sensing quality parameters, system resource parameters, and contextual parameters.

The sensing application parameters include presence detection, motion detection, moveable object counting, breathing rate measurement, heart rate measurement, shape detection, and gesture detection. In other embodiments sensing application parameters can also include people counting, simple motion detection, fine-grained motion detection, breathing detection, fall detection, heart rate detection, or any other sensing application parameter.

The sensing quality parameters include sensing speed, sensing accuracy, reliability, latency, and spatial resolution. In other embodiments the sensing quality parameters can also include detection speed, detection accuracy, quality of sensing, or any other sensing quality parameter.

The system resource parameters include a number of the one or more of the nodes, a number of nodes in the CL system, an arrangement of the one or more of the nodes, an arrangement of the nodes in the CL system, a network topology or network topologies, an energy consumption, a battery life, an available bandwidth, a required bandwidth, a connectivity, an availability of a communication technology at the one or more of the nodes, an availability of CSI at the one or more of the nodes, an availability of RSSI at the one or more of the nodes, an available processing power, and an expected RF signal exposure to an object. The system resource parameters can also include node resource parameters, system performance, node performance, network performance, range towards a gateway, meshing, network topology of the one or more of the nodes, network topology or network topologies of the nodes of the RF-based sensing system, energy consumption by the one or more of the nodes, energy consumption of the RF-based sensing system, battery life of the one or more nodes, battery life of the nodes of the RF-based sensing system, available bandwidth of the one or more of the nodes, available bandwidth of the RF-based sensing system, required bandwidth of the one or more of the nodes, required bandwidth of the RF-based sensing system, connectivity of the one or more of the nodes, connectivity of the nodes of the RF-based sensing system, or any other system resource parameter.

The contextual parameters include a currently available bandwidth for the different communication technologies, a currently available bandwidth for one or more of the different communication technologies, a time of day, an expected activity, a personalized acceptable RF signal exposure, a size of an object, a movement speed of an object, a likelihood for interference signals, a number of objects, and a disturbing object being present in a sensing volume. In other embodiments the contextual parameter can also include a trigger event, a current date, a current weekday, or any other additional contextual data. The trigger event can for example be a detection of a motion or presence in a specific volume.

In this embodiment the monitoring unit 16 includes a clock which periodically provides a current time to the processor 18 which determines a time of day, e.g., night or day, which is stored as time of day as contextual parameter. The processor 18 can also process the determined time of day directly. In other embodiments time of day can include other times of the day, such as work time, sleep time, wake up time, or the like.

In other embodiments the one or more parameters related to RF-based sensing in the CL system include one or more other monitored parameters related to RF-based sensing in the CL system. The monitoring unit can monitor various parameters. Alternatively or additionally, monitored parameters can also be provided to the control unit from nodes or a server.

The processor 18 determines a performance metric based on two or more of the parameters. The performance metric in this embodiment can depend on the sensing application, required sensing quality, system resources, and the context in which RF-based sensing is performed, i.e., the performance metric can include sensing application parameters, sensing quality parameters, system resource parameters, and contextual parameters. In this embodiment the performance metric is based on the parameters of the CL system. In particular, in this embodiment, the performance metric includes a currently available bandwidth for the different communication technologies. In other embodiments the performance metric can also be based on two or more of the parameters for the one or more of the nodes for which the communication technology is to be selected, i.e., instead of being based on the parameters of the whole CL system, the parameters can also be based on parameters of individual nodes or a set of nodes.

The processor 18 first selects the nodes which shall perform RF-based sensing based on the determined performance metric. For example, nodes can have different availability of communication technologies and can be arranged at different positions in a room. If a specific volume in the room is to be covered by RF-based sensing, only a subset of nodes which can use a specific communication technology can be selected to cover the specific volume. In other embodiments the communication technology selection device can also select one or more of the nodes for performing RF-based sensing based on the one or more parameters related to RF-based sensing in the CL system. Selecting nodes that shall perform RF-based sensing is optional. If nodes for performing RF-based sensing are not selected, all nodes in a room or of the CL system may perform RF-based sensing. For example, all nodes covering a specific volume may perform RF-based sensing.

The processor 18 then selects the nodes for which the communication technology is to be selected based on the performance metric. In other embodiments, the communication technology selection device selects the one or more of the nodes for which the communication technology is to be selected by the communication technology selection device based on the one or more parameters related to RF-based sensing in the CL system. Selecting nodes for which the communication technology is to be selected is optional. If nodes for which the communication technology is to be selected are not selected, the communication technologies for performing RF-based sensing may be selected for all nodes in a room or of the CL system, or all nodes which cover a specific volume.

Finally, the processor 18 selects the communication technology for the nodes in dependence of the performance metric. In this embodiment, the processor 18 selects narrowband communication technology ZigBee or a wideband communication technology of the WiFi communication technologies based on the performance metric in order to optimize the performance of the RF-based sensing. In other embodiments, for example the method as presented in FIG. 4 for selecting the communication technology for the one or more nodes for performing RF-based sensing can be used by the communication technology selection device for selecting the communication technology.

FIG. 2 shows schematically and exemplarily a first embodiment of the RF-based sensing system in form of CL system 100. The CL system 100 can perform RF-based sensing using one or more of two or more communication technologies available in the RF-based sensing system.

The CL system 100 includes the communication technology selection device 10 of FIG. 1 and three nodes in form of Hue bridge 26, and luminaires 28 and 30.

In other embodiments, any other embodiment of the communication technology selection device may be included in the CL system. Additionally or alternatively, a different number and arrangement of nodes, as well as different types of nodes, e.g., switches, sensors, or any other type of node that is configured for performing RF-based sensing using one or more of the two or more different communication technologies can be provided in the RF-based sensing system.

The CL system 100 is connected to a server 200 via the Hue bridge 26. In this embodiment, the communication technology selection device 10 is included in the Hue bridge 26. In other embodiments the communication technology selection device can also be included in any other kind of node, e.g., in a gateway or access point, or it can be wirelessly connected to a gateway or access point. The communication technology selection device 10 can also be a standalone device.

The Hue bridge 26 and the luminaires 28 and 30 perform RF-based sensing in order to detect the motion of a moveable object in form of a person 32. In other embodiments, the RF-based sensing system can also be used for any other sensing application by performing RF-based sensing. Other sensing applications can for example include people counting or breathing measurements.

In this embodiment, the Hue bridge 26 and the luminaires 28 and 30 perform RF-based sensing using a WiFi communication technology 34 in the 60 GHz band, e.g. using the IEEE 802.11ay communication protocol, or a ZigBee communication technology 36, e.g. using the IEEE 802.15.4 communication protocol. In other embodiments the nodes can also perform RF-based sensing using one or more of the two or more different communication technologies.

Both the ZigBee communication technology 36 and the WiFi communication technology in the 60 GHz band 34 are available in the Hue bridge 26 and the luminaires 28 and 30. The luminaires 28 and 30 each include a ZigBee transceiver 22 and a WiFi transceiver 24 and corresponding antennas (not shown).

In this embodiment, the communication technology selection device 10 selected the ZigBee communication technology 36 for performing RF-based sensing for the Hue bridge 26, and the luminaires 28 and 30 based on parameters related to RF-based sensing of the CL system 100. Hence, each of the nodes transmits RF signals to the two other nodes and receives and analyzes disturbed RF signals from the other nodes. The WiFi communication technology 34 is used for wirelessly communicating between the Hue bridge 26 and the luminaires 28 and 30.

In other embodiments the server can be replaced by a remote control, e.g., a smartphone. The remote control can remotely control the CL system using wireless communication, e.g., selecting a sensing application, activating luminaires of the CL system, controlling other functions of the CL system, or combinations thereof. In yet other embodiments, the RF-based sensing system can include a server and a remote control.

FIG. 3 shows schematically and exemplarily a second embodiment of the RF-based sensing system in form of CL system 100'. CL system 100' is similar to the CL system 100 of FIG. 2.

The CL system 100' includes the communication technology selection device 10 of FIG. 1 and three nodes in form of Hue bridge 26, and luminaires 28 and 30'. In contrast to CL system 100 of FIG. 2, luminaire 30 only includes WiFi transceiver 24 and thus only the WiFi communication technology 34 is available in luminaire 30'.

In this embodiment the technology selection device 10 selects the ZigBee communication technology 36 for performing RF-based sensing for the Hue bridge 26 and luminaire 28 and the WiFi communication technology 34 in the 60 GHz band for performing RF-based sensing for the Hue bridge 26 and the luminaire 30'. Hence, in this embodiment, the Hue bridge 26 uses both communication technologies for RF-based sensing. The luminaire 30' performs RF-based sensing using the WiFi communication technology 34 in the 60 GHz band. Both CSI and RSSI are available at the Hue bridge 26 and the luminaire 30' in this embodiment. As CSI allows an improved performance, the WiFi communication technology 34 uses CSI in this embodiment. The luminaire 28 performs RF-based sensing using the ZigBee communication technology 36. Hence, luminaire 30' and Hue bridge 26 transmit and receive RF signals generated by the WiFi communication technology 34 for performing RF-based sensing. Additionally, luminaire 28 and Hue bridge 26 transmit and receive RF signals generated by the ZigBee communication technology 36 for performing RF-based sensing. In other embodiments, the nodes can also be configured for transmitting RF signals and receiving and analyzing disturbed and/or reflected RF signals from the same or another node.

In other embodiments nodes can be arranged differently and can include a mix of different nodes, e.g., first nodes having available a first communication technology, second nodes having available a second communication technology, and nodes having available both communication technologies. The first communication technology can for example be a narrowband communication technology and the second communication technology can be a wideband communication technology. In the following exemplarily the narrowband communication technology can be the same ZigBee communication technology as mentioned above. Any other narrowband communication technology can additionally or alternatively be used. In the following exemplarily wideband communication technologies can be WiFi communication technologies in the 2.4 GHz band, 5 GHz band, and 60 GHz band. Any other wideband communication technology can be used alternatively or additionally.

In the following several embodiments of RF-based sensing systems, in particular CL systems are presented without figures that have differently mixed node arrangements and which perform different sensing applications. The communication technology for performing RF-based sensing is selected for the respective nodes for optimal performance by the communication technology selection device for the sensing application of the respective embodiment.

The selection of the communication technology can be based on a performance metric determined based on two or more parameters of the RF-based sensing system, or based on one or more, e.g. two or more parameters of the one or more nodes for which the communication technology is to be selected.

In an embodiment, a CL system is arranged in an office space. The CL system includes luminaires which each have available the ZigBee communication technology and a WiFi communication technology. Furthermore, the CL system includes a connected camera for recording videos and a Hue bridge being connected to a server. In a normal operation mode, the ZigBee communication technology is used for RF-based sensing as it requires lower power and consumes less energy than the WiFi communication technology. The WiFi communication technology can for example be used for streaming data from the connected camera towards the Hue bridge. The ZigBee communication technology is used by the luminaires when possible and WiFi is only activated for a subset of luminaires and the connected camera when needed.

In another embodiment the CL system of the previously described embodiment is arranged in an outdoor scenario. The Hue bridge is replaced by an outdoor lighting control (OLC), e.g., a CityTouch node, which performs similar functions as the Hue bridge. The CityTouch node can perform RF-based sensing using ZigBee communication technology or WiFi communication technology. The CL system can perform RF-based sensing using the ZigBee communication technology until occurrence of a trigger event such as detection of presence of a person. When presence of a person is detected using the ZigBee communication technology, the CL system can switch to RF-based sensing using the WiFi communication technology, e.g., for determining a breathing rate or heart rate of the detected person. This allows performing RF-based sensing with low energy consumption and various sensing applications.

In another embodiment, the RF-based sensing system comprises a large amount of nodes. The amount of nodes is that large, that the ZigBee communication technology cannot sustain the additional sensing traffic generated by the RF-based sensing, i.e., the currently available bandwidth for the ZigBee communication technology is low. In this case, the communication technology selection device can select a WiFi communication technology with a currently larger bandwidth that can sustain the additional sensing traffic. The communication technology can be selected for all of the nodes or a subset of the nodes of the RF-based sensing system. In particular, only a subset of nodes in a specific volume may not be able to sustain the sensing traffic, e.g., in an office space where the density of nodes in form of luminaires is high. In other volumes, e.g., in hallways, coffee corners or other places, the density of the nodes may be lower, such that the sensing traffic may be sustained using the ZigBee communication technology. A subset of nodes that cannot sustain the sensing traffic using the ZigBee communication technology can be switched to the WiFi communication technology while the other nodes can perform RF-based sensing using ZigBee. Performing RF-based sensing using the WiFi communication technology, can for example use nodes, such as smoke detectors, in particular battery-operated smoke detectors.

In another embodiment, the RF-based sensing system has cellular communication technology and ZigBee communication technology available. For example, nodes in form of outdoor luminaires can be arranged at a small parking lot of a building. The outdoor luminaires can for example include a cellular light controller, such as Signify InterAct City. The outdoor luminaires typically report their status and receive a control signal including a lighting schedule using the cellular communication technology once a day. During daytime, the RF-based sensing system can perform RF-based sensing using the ZigBee communication technology. During nighttime, RF-based sensing can be performed using the cellular communication technology when currently available bandwidth is high. The RF-based sensing can for example be used for fall detection, such as for detecting intruders.

In another embodiment, a subset of nodes has available a WiFi communication technology with CSI and another subset of nodes has available a WiFi communication technology with RSSI. The WiFi communication technology has a worse performance for performing RF-based sensing using the WiFi communication technology with RSSI compared to using the WiFi communication technology with CSI. CSI is typically not available in narrowband communication technologies and can provide richer information about signal absorption, reflections, delays, multipath, and other information. Whether CSI or RSSI is available in a node therefore may be decisive for selecting the communication technology that optimizes the performance for performing RF-based sensing.

In another embodiment, in which in a first node a WiFi communication technology with CSI is available for performing RF-based sensing and in a second node a WiFi communication with CSI is not available, but only a WiFi communication technology with RSSI, the second node is preferably used as a transmitter node and the first node is used as a receiver node. This allows to beneficially use CSI in this case as CSI is a property of the receiver node.

In another embodiment, the RF-based sensing system includes nodes having a ZigBee communication technology available and nodes having a wideband WiFi communication technology available. The communication technology selection device can select a communication technology which optimizes performance for RF-based sensing of the RF-based sensing system. In this case, selecting a communication technology corresponds to selecting the nodes for performing RF-based sensing as only one type of communication technology is available on each respective node.

For example, if the density and currently available bandwidth for the nodes that have available the ZigBee communication technology is sufficient for performing RF-based sensing, the other nodes do not need to perform RF-based sensing. Instead only RF-based sensing is performed using the ZigBee communication technology by the nodes which have it available.

If for example, the density or currently available bandwidth of the nodes that have available the ZigBee communication technology is not sufficient for performing RF-based sensing, the other nodes need to perform RF-based sensing using the WiFi communication technology. If the nodes have the WiFi communication technology with RSSI and not CSI available, then all nodes are used for performing RF-based sensing with a sufficient performance, i.e., both communication technologies are used.

For example, if the density or currently available bandwidth or battery life of the nodes that have available the ZigBee communication technology is not sufficient for performing RF-based sensing, the other nodes need to perform RF-based sensing using the WiFi communication technology. If the nodes have the WiFi communication technology with CSI available, then performing RF-based sensing using the WiFi communication technology with CSI by a subset of the nodes is sufficient for achieving a good performance for RF-based sensing.

The arrangement of the nodes and in particular their respective positions can be important for the selection of the nodes and communication technologies for performing RF-based sensing. This can be a consequence of a spatial effect of RF signals in terms of absorption, attenuation, and other properties. In an embodiment, a CL system is provided in a building with a large number of rooms. In each of the rooms all except one of the nodes in form of luminaires have the ZigBee communication technology available and only the one node per room additionally has a WiFi communication technology available for communicating with a central gateway in the building. In this situation, the CL system may choose to deploy partially overlapping RF-based sensing volumes in which the luminaires having the ZigBee communication technology available perform local RF-based sensing using the ZigBee technology. The nodes having the WiFi communication technology available perform RF-based sensing for larger volumes using the WiFi communication technology. The WiFi communication technology is thus used for larger area, floor-level coarse detection among the nodes themselves. The nodes performing RF-based sensing using the WiFi communication technology have a larger bandwidth and are able for detecting subtler movements such as breathing, trembling and a person falling, albeit not being able to localize the respective event as well as the denser network of luminaires performing RF-based sensing using the ZigBee communication technology. Hence, the luminaires performing RF-based sensing using the ZigBee communication technology may be used for determining a room where the respective event occurs while the nodes performing RF-based sensing using the WiFi communication technology can be used for classifying the nature of the respective event.

The nodes using the ZigBee communication technology and the nodes using the WiFi communication technology can have different network topologies in terms of how they communicate with each other and with the server. In an embodiment in which a subset of nodes of a RF-based sensing system uses the ZigBee communication technology and another subset of nodes uses the WiFi communication technology, the nodes using the ZigBee communication technology can perform RF-based sensing dynamically when a volume is known to be empty. Due to the meshing of nodes using the ZigBee communication technology, blind spots within a specific volume can be better covered. Once a presence or motion is detected by the nodes using the ZigBee communication technology, the nodes having the WiFi communication technology available can be selected for performing RF-based sensing in the specific volume in which the motion or presence is detected. The nodes having the WiFi communication technology available can be connected in a star topology towards a local access point, e.g., a Hue bridge. Performing RF-based sensing using the WiFi communication technology allows breathing measurements and fall detection. In other embodiments, this may for instance be used for parking lots with CityTouch nodes.

Performing RF-based sensing using the WiFi communication technology on a limited number of nodes can also for example be used for a coarse sensing, e.g., in order to detect an intruder, even when a location cannot be exactly determined due to the limited number of nodes.

In another embodiment, nodes may be selected for performing RF-based sensing using the ZigBee communication technology for determining a trigger event, such as a basic motion detection. When the trigger event is detected, these nodes can be switched off or the nodes can fall back to a lower requirement mode of operation to free up network bandwidth or reduce energy consumption. Simultaneously, nodes for performing RF-based sensing using the WiFi communication technology may be selected in order to perform sensing applications that require higher bandwidth or constant communication to a server of the building. For example, the ZigBee communication technology can be used for RF-based sensing when the volume is an office space in which it has to be ensured that lights are turned on quickly when presence is detected while low energy consumption is to be ensured. Once presence is detected, the WiFi communication technology is used for performing RF-based sensing to do accurate people counting, determination of breathing rates of office occupants for which cloud connection is needed as the algorithm is too heavy to run on the nodes. The CL system can be configured to automatically turn off the lights if no breathing rate or presence is detected in a predetermined period, such as 10 minutes.

In another embodiment, one or more nodes of a RF-based sensing system perform RF-based sensing. A node with the best connectivity to or nodes with threshold level connectivity to the Hue bridge of the RF-based sensing system can additionally have a more complex or resource demanding role than the other nodes. For example, these nodes can be selected for running specific algorithms of specific sensing applications. In this case, for example, the node or nodes can run a detection algorithm and transmit their processed data to the Hue bridge. The processed data can be results of a detection or pre-processed data, such as aggregated data, which can reduce the amount of data to be transmitted to the Hue bridge, as well as an amount of processing to be performed on the Hue bridge. Alternatively or additionally, nodes that have available both communication technologies, or that have a shortest or most reliable path towards a gateway or access point can be selected for running specific algorithms of specific sensing applications.

Limitations on certain parameters might lead to the system choosing to switch over between ZigBee communication technology and WiFi communication technology.

The RF-based sensing system may also choose to use a combination of both communication technologies and respective nodes having them available in a specific volume if that allows easier network loading in the specific volume. For example, in a living room that is enabled with a Hue entertainment feature, nodes such as Smart television (TV), game console, voice assistant, etc. that have the WiFi communication technology available may preferably perform RF-based sensing as nodes in the vicinity that use the ZigBee communication technology for performing RF-based sensing may not sustain the additional sensing traffic. Farther away, however, such as in the dining room, nodes performing RF-based sensing using the ZigBee communication technology can be used for performing RF-based sensing without major inconvenience.

In another embodiment, in which one node has available both communication technologies, one of the communication technologies can be used for RF-based sensing while the other is used for wirelessly communicating with other nodes and the Hue bridge. The tradeoff between available system resources and sensing application demands can be used as one factor in determining whether RF-based sensing should be performed using the WiFi or the ZigBee communication technology.

In one embodiment the selection of the communication technology depends on the sensing application required at a specific moment in time. Unlike RF-based sensing using the ZigBee communication technology, RF-based sensing using the WiFi communication technology can be used for fall-detection and breathing detection, as well as heart rate detection, when for example the 60 GHz band of the IEEE 802.1 lay communication protocol is used. Upon detection of a trigger event using the ZigBee communication technology that a person is in the room during night hours, the WiFi communication technology can be selected for performing RF-based sensing in order to monitor the breathing during sleep.

Figure 4:
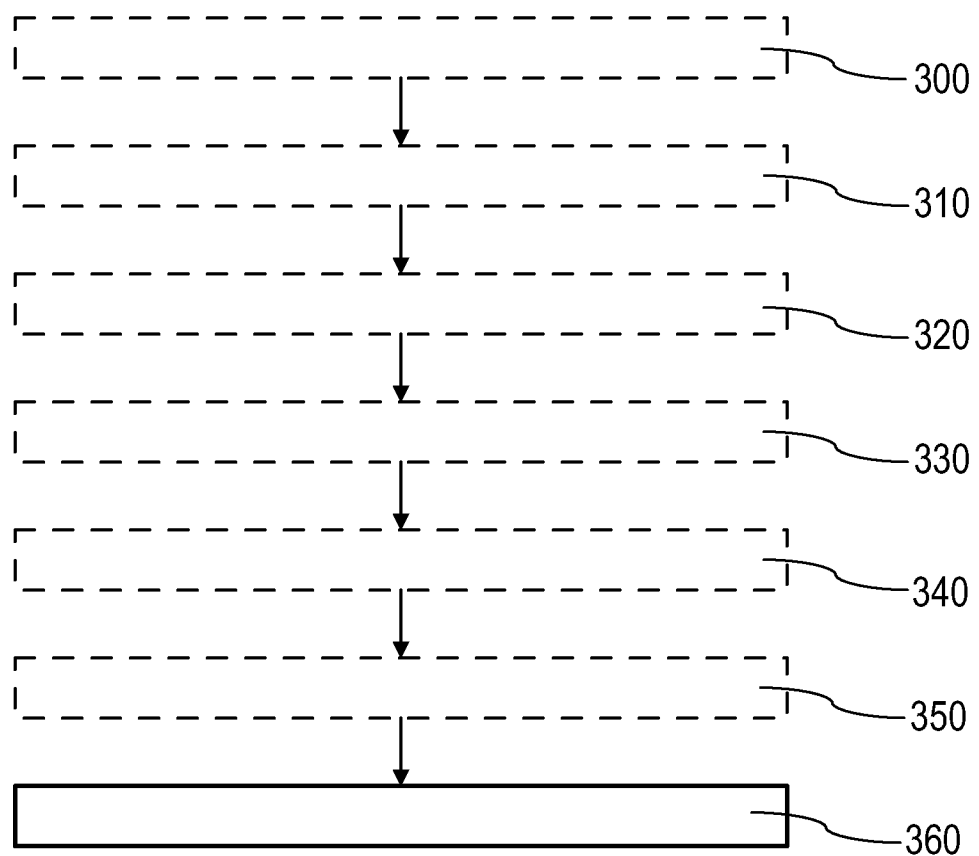
FIG. 4 shows an embodiment of the method for selecting a communication technology for performing RF-based sensing in a RF-based sensing system.

FIG. 4 shows an embodiment of a method for selecting a communication technology for performing RF-based sensing using one or more of two or more different communication technologies in a RF-based sensing system including one or more nodes, e.g., the CL system 100 of FIG. 2 or the CL system 100' of FIG. 3. The CL system uses one or more of two or more different communication technologies for performing RF-based sensing. In this embodiment, the CL system uses ZigBee and three different WiFi communication technologies, namely a IEEE 802.11ax protocol operating in the 2.4 GHz band and in the 5 GHz band, and a IEEE 802.1 lay protocol operating in the 60 GHz band. ZigBee is a narrowband communication technology and the WiFi communication technologies in the 2.4 GHz band, the 5 GHz band, and the 60 GHz band are wideband communication technologies.

In step 300, a parameter related to RF-based sensing in the CL system, namely a currently available bandwidth for the different communication technologies is monitored. In other embodiments one or more parameters related to RF-based sensing in the RF-based sensing system can be monitored, e.g., a current time. Step 300 is optional. The monitoring of one or more parameters can also be performed continuously and updated values of the monitored parameters can be used in any of the steps 310 to 360.

In step 310, a performance metric is calculated as a weighted average value of the monitored parameters and stored parameters related to RF-based sensing in the CL system. For categorical parameters, values can be assigned in a manner, such that a respective weighted average value can be calculated for the performance metric. The parameters are sensing application parameters, sensing quality parameters, system resource parameters, and contextual parameters. In other embodiments, the performance metric can be determined based on two or more parameters related to RF-based sensing in the CL system. Step 310 is optional.

In step 320, one or more nodes of the CL system are selected for performing RF-based sensing in dependence of the performance metric calculated in step 310. In other embodiments one or more nodes of the RF-based sensing system can be selected based on one or more parameters related to RF-based sensing in the RF-based sensing system. Step 320 is optional.

In step 330, a performance metric is calculated for the nodes selected in step 320 as a weighted average value of the parameters related to RF-based sensing of the nodes selected in step 320. Step 330 is optional.

In step 340, one or more of the selected nodes are selected for which a communication technology for performing RF-based sensing is to be selected in dependence of the performance metric calculated in step 330. In other embodiments one or more of the nodes can be selected for which the communication technology is to be selected based on the one or more parameters related to RF-based sensing in the RF-based sensing system. Step 340 is optional.

In step 350, a performance metric is calculated for the nodes selected in step 340 as a weighted average value of the parameters related to RF-based sensing of the nodes selected in step 340. Step 350 is optional.

In step 360, a communication technology for performing RF-based sensing in the CL system is selected for the nodes selected in step 340 in dependence of the performance metric calculated in step 350. In other embodiments a communication technology for performing RF-based sensing in the RF-based sensing system can be selected for one or more nodes based on one or more parameters related to RF-based sensing in the RF-based sensing system.

In this embodiment the communication technology is ZigBee communication technology or one of the WiFi communication technologies, e.g. a IEEE 802.11ax communication technology operating in the 2.4 GHz band or in the 5 GHz band, or a IEEE 802.11ay communication technology operating in the 60 GHz band. The communication technology is selected for the nodes such that the performance of the RF-based sensing is optimized.

In other embodiments other communication technologies may be available for selection including a Tread communication technology, a BLE communication technology, or other narrowband communication technologies, other wideband communication technologies, or combinations thereof.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein the RF-based sensing system is a heating ventilation air conditioning (HVAC) system or any other type of connected system, particularly home automation system. In this case, a HVAC room controller, such as a touch display, a HVAC sensor, such as a HVAC passive infrared (PIR) sensor, a wireless receptacle, and a HVAC damper can include one or more communication technologies, such that the HVAC system can perform RF-based sensing using two or more different communication technologies.

Other variations to the disclosed embodiments can be understood and effected by those skilled in the art in practicing the claimed invention, from a study of the drawings, the disclosure, and the appended claims.

In the claims, the word "comprising" and "including" does not exclude other elements or steps, and the indefinite article "a" or "an" does not exclude a plurality.

A single unit, processor, or device may fulfill the functions of several items recited in the claims. The mere fact that certain measures are recited in mutually different dependent claims does not indicate that a combination of these measures cannot be used to advantage.

Operations like selecting a communication technology for performing RF-based sensing in the RF-based sensing system for one or more of the nodes based on one or more parameters related to RF-based sensing in the RF-based sensing system, selecting the one or more of the nodes for which the communication technology is to be selected based on the one or more parameters related to RF-based sensing in the RF-based sensing system, determining a performance metric based on two or more of the parameters for the one or more of the nodes for which the communication technology is to be selected, selecting the communication technology in dependence of the performance metric, monitoring one or more parameters related to RF-based sensing in the RF-based sensing system, selecting one or more of the nodes for performing RF-based sensing based on the one or more parameters related to RF-based sensing in the RF-based sensing system, et cetera performed by one or several units or devices can be performed by any other number of units or devices. These operations and/or the method can be implemented as program code means of a computer program and/or as dedicated hardware.

A computer program product may be stored/distributed on a suitable medium, such as an optical storage medium, or a solid-state medium, supplied together with or as part of other hardware, but may also be distributed in other forms, such as via the Internet, Ethernet, or other wired or wireless telecommunication systems.

Any reference signs in the claims should not be construed as limiting the scope.

The present invention relates to selecting a communication technology in a RF-based sensing system with one or more nodes. The RF-based sensing system is configured for performing RF-based sensing using one or more of two or more different communication technologies. A communication technology for performing RF-based sensing in the RF-based sensing system is selected for one or more of the nodes based on one or more parameters related to RF-based sensing in the RF-based sensing system. A communication technology optimal for a current sensing application with a current sensing quality requirement in a current context considering the available system resources can be selected. The communication technologies can be wideband and narrowband communication technologies. The parameters can include sensing application parameters, sensing quality parameters, system resource parameters, and contextual parameters.

The invention claimed is:

1. A communication technology selection device for a radio frequency based sensing system with a plurality of nodes, the radio frequency based sensing system being configured for performing radio frequency based sensing using one or more of two or more different communication technologies, wherein the communication technology selection device is configured for selecting a first communication technology for performing radio frequency based sensing in the radio frequency based sensing system for one or more first nodes of the plurality of nodes based on one or more first parameters related to the radio frequency based sensing in the radio frequency based sensing system by the first nodes to perform a first function, and for selecting a second communication technology for performing radio frequency based sensing in the radio frequency based sensing system for one or more second nodes of the plurality of nodes based on one or more second parameters related to the radio frequency based sensing in the radio frequency based sensing system by the second nodes to perform a second function, wherein the radio frequency based sensing is sensing for presence of one or more humans or pets within one or more specific volumes covered by an arrangement of the first nodes and the second nodes;
  wherein the two or more communication technologies include one or more narrowband communication technologies and one or more wideband communication technologies; and
  wherein the communication technology selection device is configured to cause the one or more first nodes to use the first selected communication technology and simultaneously to cause the one or more second nodes to use the second selected communication technology for performing radio frequency based sensing.

2. The communication technology selection device according to claim 1, wherein the one or more first parameters related to the radio frequency based sensing in the radio frequency based sensing system include one or more of:
  a sensing application parameter, which includes one or more of:
    presence detection, motion detection, moveable object counting, breathing rate measurement, heart rate measurement, shape detection, gesture detection, and
  a sensing quality parameter, which includes one or more of:
    sensing speed, sensing accuracy, reliability, latency, spatial resolution.

3. The communication technology selection device according to claim 1, wherein the communication technology selection device is configured for determining a performance metric based on two or more of the parameters related to radio frequency based sensing in the radio frequency based sensing system for the the first nodes and/or the second nodes for which the communication technology is to be selected and for selecting the communication technology in dependence of the performance metric.

4. The communication technology selection device according to claim 1, wherein the one or more first parameters related to radio frequency based sensing in the radio frequency based sensing system include one or more monitored parameters related to radio frequency based sensing in the radio frequency based sensing system.

5. The communication technology selection device according to claim 1, wherein the communication technology selection device is configured for selecting one or more of the nodes for performing radio frequency based sensing based on the one or more first parameters related to radio frequency based sensing in the radio frequency based sensing system.

6. The communication technology selection device according to claim 1, wherein the communication technology selection device is configured for selecting the one or more of the nodes for which the communication technology is to be selected by the communication technology selection device based on the one or more first parameters related to radio frequency based sensing in the radio frequency based sensing system.

7. A radio frequency based sensing system for performing radio frequency based sensing using one or more of two or more different communication technologies, comprising
  the communication technology selection device according to claim 1 and
  one or more nodes, each of the nodes configured for performing radio frequency based sensing using one or more of the two or more different communication technologies.

8. The radio frequency based sensing system according to claim 7, wherein the two or more different communication technologies are available in one or more of the plurality of nodes.

9. The radio frequency based sensing system according to claim 7, wherein the communication technology selection device is included in one or more of the plurality of nodes.

10. The radio frequency based sensing system according to claim 7, wherein one or more of the nodes are configured for performing radio frequency based sensing using a first communication technology and one or more other of the nodes are configured for performing radio frequency based sensing using a second communication technology.

11. The radio frequency based sensing system according to claim 10, wherein the one or more of the nodes configured for performing radio frequency based sensing using the first communication technology are for determining a room in which an event occurs and the one or more other of the nodes configured for performing radio frequency based sensing using the second communication technology are used for classifying a nature of the event.

12. The communication technology selection device according to claim 1, wherein the one or more first parameters related to the radio frequency based sensing in the radio frequency based sensing system include one or more of:
  a system resource parameter, which includes one or more of:
    a number of the one or more of the nodes, a number of nodes in the radio frequency based sensing system, an arrangement of the one or more of the nodes, an arrangement of the nodes in the radio frequency based sensing system, a network topology or network topologies, an available bandwidth, a required bandwidth, a connectivity, an availability of a communication technology at the one or more of the nodes, an availability of channel state information at the one or more of the nodes, an availability of received signal strength indication at the one or more of the nodes, an available processing power, an expected radio frequency signal exposure to an object,
  a contextual parameter, which includes one or more of:
    a currently available bandwidth for the two or more different communication technologies, a currently available bandwidth for one or more of the two or more different communication technologies, a time of day, an expected activity, a personalized acceptable radio frequency signal exposure, a size of an object, a movement speed of an object, a likelihood for interference signals, a number of objects, a disturbing object being present in a sensing volume.

13. The communication technology selection device according to claim 1, wherein the one or more first parameters related to the radio frequency based sensing in the radio frequency based sensing system include a sensing application parameter, which includes one or more of:
presence detection, motion detection, moveable object counting.

14. The communication technology selection device according to claim 1, wherein the plurality of nodes include at least two nodes arranged at different positions in a room.

15. The communication technology selection device according to claim 14, wherein the at least two nodes comprise at least two luminaries.

16. The communication technology selection device according to claim 14, wherein the communication technology selection device is configured to cause the one or more of the nodes to use a wideband communication technology for performing the radio frequency bases sensing by communicating with the one or more of the nodes using a broadband communication technology.

17. A method for selecting a communication technology for performing radio frequency based sensing in a radio frequency based sensing system including a plurality of nodes, the radio frequency based sensing system being configured for using one or more of two or more different communication technologies for performing radio frequency based sensing, comprising:
selecting a first communication technology for performing radio frequency based sensing in the radio frequency based sensing system for one or more first nodes of the plurality of nodes based on one or more first parameters related to the radio frequency based sensing in the radio frequency based sensing system by the first nodes to perform a first function;
selecting a second communication technology for performing radio frequency based sensing in the radio frequency based sensing system for one or more second nodes of the plurality of nodes based on one or more second parameters related to the radio frequency based sensing in the radio frequency based sensing system by the second nodes to perform a second function; and
wherein the two or more communication technologies include one or more narrowband communication technologies and one or more wideband communication technologies;
wherein the method further comprises:
causing the one or more first nodes to use the first selected communication technology and simultaneously causing the one or more second nodes to use the second selected communication technology for performing radio frequency based sensing,
wherein the radio frequency based sensing is sensing for a presence within one or more specific volumes covered by an arrangement of the first nodes and the second nodes.

18. The method according to claim 17 further comprising:
selecting the one or more of the nodes for which the communication technology is to be selected based on the one or more first parameters related to radio frequency based sensing in the radio frequency based sensing system.

19. A computer program product for selecting a communication technology for performing radio frequency based sensing in a radio frequency based sensing system with one or more nodes, the radio frequency based sensing system being configured for performing radio frequency based sensing using one or more of two or more different communication technologies, wherein the computer program product comprises a non-transitory computer readable medium storing instructions when executed by a processor cause the processor to perform the method as defined in claim 17.

* * * * *